United States Patent Office 3,393,167
Patented July 16, 1968

3,393,167
EPOXY RESIN-CONTAINING INK AND PROCESS
FOR PRINTING WITH SAID INKS
Frederick A. Varron, Wayne, and Frank R. Russo, Bloomingdale, N.J., assignors to International Corporation, New York, N.Y., a corporation of Ohio
No Drawing. Filed June 1, 1965, Ser. No. 460,503
13 Claims. (Cl. 260—28.5)

ABSTRACT OF THE DISCLOSURE

A novel printing ink composition consisting of a pigment dispersed in a vehicle composed of an epoxidized butadiene resin, a dispersed wax, a boron trifluoride monoethylamine complex in an etherified glycol solvent. The inks are particularly suitable for printing on glass and metal.

---

This invention relates to novel inks containing epoxy resin binders which are particularly suitable for printing on glass as well as on metals.

Inks used in printing on glass articles, such as milk bottles, soda bottles and beer bottles must have the following properties. They must give hard printed films, which are abrasion resistant and solvent resistant, and they must display excellent adhesion to glass. The last property is relatively rare in inks, since most inks display poor adhesion to glass.

We have discovered a novel epoxy resin containing inks which has all of the above properties with respect to glass printing and in addition is very stable both on the press and during storage. Furthermore, the inks will not harm the rubber rollers found in most apparatus used in printing on glass, such as letterpress, lithographic or dry offset equipment.

The binder used in the ink of this invention is an epoxy resin having the formula:

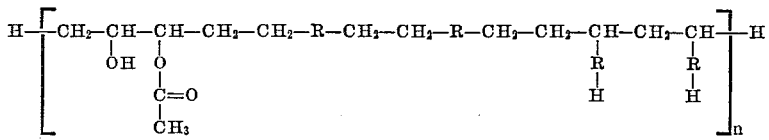

where R is a member selected from the group consisting of

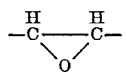

and

there being at least one of each member present in the molecule, the $n$ being a number of such magnitude that the molecular weight of the resin is from about 1200 to 1500. The resin is an epoxized polybutadiene and is sold under the trademark "Oxiron." In addition to "Oxiron 2000" which has an epoxy percentage of 9%, a hydroxyl percentage of 2.5%, an epoxy equivalent of 177 (number of grams of resin containing 1 equivalent of epoxide) and an iodine number of 185, "Oxiron 2001" having substantially the same structure with an epoxy percentage of 11%, a hydroxyl percentage of 2.0%, an epoxy equivalent of 145 and an iodine member of 154 may also be used. Along with the binder, there is used as catalyst, boron trifluoride monoethylamine complex.

The combination of the selected monoethers of polyglycols and the wax in the vehicle is essential to the practice of this invention. The strong solvents conventionally used for coatings containing the "Oxiron" resins such as aromatics and oxygenated solvents such as ketones and esters could not be used in printing inks since such solvents attack the rubber rollers in the printing equipment. On the other hand, when alcohols and glycols are used as solvents in the inks, the inks exhibit stringiness, undesirable adhesion to the rubber rollers causing inadequate distribution as well as ink flying. Monoalkyl ethers of ethylene glycol are either too volatile to be used as solvents in the inks of this invention or, as does the butyl ether of ethylene glycol, they attack the rubber rollers. Likewise, "Carbitol" type solvents (the alkyl ethers of diethylene glycol) attack the rubber rollers in the printing equipment.

We have found that methyl and ethyl monoethers of triethylene glycol, dipropylene glycol and tripropylene glycol having either petroleum wax or polyethylene wax dispersed therein make excellent solvents for the epoxy resin-catalyst combination of this invention. These selected solvents containing the dispersed waxes do not attack rubber rollers. Neither do inks containing these solvent-wax combinations exhibit any stringiness, undesirable adhesion to rubber rollers or flying on the press. On the other hand, when the wax is eliminated, even inks containing these selected monoethers of dipropylene, tripropylene and triethylene glycol solvents display stringiness, flying and undesirable adhesion to the rubber rollers.

This effect of the wax is surprising since waxes are not used in printing inks for glass or metal. In printing, waxes are primarily used to increase surface slippage of printed matter and to decrease tackiness of the ink. However, in the case of printing on glass or metal, these problems do not exist and consequently waxes have not been used. Moreover, particularly in the case of glass with which ink adhesion is quite difficult to achieve, waxes were generally believed and in many cases found to significantly decrease the ink adhesion. In the present combination, the wax appears to have no effect on adhesion.

The polyethylene waxes used in this invention may be defined as polymers of ethylene with molecular weight between 2,000 and 6,000. They are produced by the catalytic polymerization of ethylene at pressures of 600–1,000 atmospheres and temperatures up to 200° C. Most preferable of the polyethylene waxes are the nonemulsifiable polyethylene waxes having a molecular weight range of 2,500 to 3,000.

The petroleum waxes are composed almost entirely of paraffin hydrocarbons. Operable petroleum waxes include paraffin wax, a typical mixture of which includes paraffins from $C_{18}H_{38}$ to $C_{32}H_{66}$ and microcrystalline wax which includes paraffins from $C_{34}H_{70}$ to $C_{43}H_{88}$.

In the present specification and claims, all proportions are by weight unless otherwise set forth. The epoxy resin preferably constitutes from 40 to 90%, and most preferably from 50 to 70% of the total vehicle weight. The boron trifluoride monoethylamine preferably is equal to from 1 to 5% of the total vehicle weight while the wax preferably constitutes from 2 to 6% of the total vehicle. The remainder of the vehicle weight is constituted by the solvent. While the solvent may be made up entirely of the previously described operable monoethers of polyglycols, if desired, in order to reduce the cost of the inks, volatile aliphatic hydrocarbon solvents, particularly those having a boiling range of from about 430° to 600° F. may be used as cosolvent. Preferably these cosolvents should not exceed 60–70% of the total solvent weight.

Any conventional pigment, e.g., chrome yellow, ultramarine blue, carbon black and titanium dioxide may be used in our inks in the conventional proportions of pigments in inks, e.g., the pigment may constitute from 5 to 70% of the ink weight.

While we have dealt with the case of the inks of this invention for printing on glass and metal, these inks provide excellent printing on other substrates such as paper and plastic sheets and articles.

The following examples will illustrate the practice of this invention.

EXAMPLE 1

In a vehicle of the following composition:

| | Parts by weight |
|---|---|
| Oxiron 2000 [1] | 50.0 |
| Dowanol 62B (the monomethyl ether of tripropylene glycol) | 25.8 |
| Boron trifluoride monoethylamine complex | 1.2 |
| The following ingredients are dispersed: | |
|    Polyethylene wax having a molecular weight of 2,500 to 3,000 | 3.0 |
|    Phthalocyanine blue pigment | 20.0 |

[1] An epoxy resin having the formula:

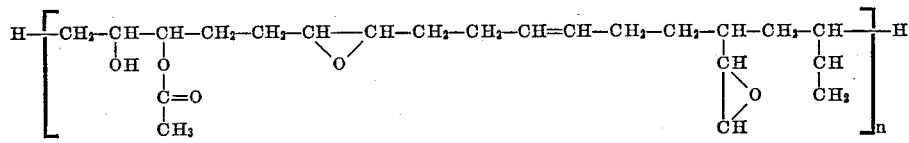

having a molecular weight of 1,200 to 1,500 an epoxy percent of 9.0%, an epoxy equivalent of 177, a hydroxyl percent of 2.5% and an iodine number of 185.

The resulting ink is then used to print upon glass bottles. The printed film is cured by heating at 350° F. for 2 minutes. The printed ink is hard, displays excellent adhesion to the glass, excellent solvent resistance, and abrasion resistance. The ink is then used in printing on steel sheet metal with the same result.

EXAMPLE 2

Example 1 is repeated using the same procedure, ingredients, proportions and conditions except that in place of the Dowanol 62B, there are respectively used: monomethyl ether of triethylene glycol, the monoethyl ether of tripropylene glycol and the monomethyl ether of dipropylene glycol, the results are substantially the same as those of Example 1 in each case.

EXAMPLE 3

Example 1 is repeated using the same procedure, ingredients, proportions and conditions, except that in place of the polyethylene wax there is used a microcrystalline wax having a melting point of 194° F.

The resulting printing has substantially the same properties as that of Example 1.

EXAMPLE 4

Example 1 is repeated using the same procedure, ingredients, proportions and conditions, except that in place of the polyethylene wax, there is used a paraffin wax having a melting point of 78° C.

The resulting printed ink films have substantially the same properties as those of Example 1.

EXAMPLE 5

Example 1 is repeated using the same ingredients, proportions, conditions and procedure, except that in place of a portion (9 parts) of the Dowanol 62B, there is used a volatile aliphatic hydrocarbon having a boiling point range of from 375° F. to 475° F. and a K.B. value of 24.

The resulting printed ink films have substantially the same properties as those of Example 1.

What is claimed is:
1. An ink consisting essentially of pigment dispersed in a vehicle consisting essentially of (1) a solution in an etherified polyglycol solvent selected from the group consisting of methyl and ethyl monoethers of triethylene glycol, dipropylene glycol and tripropylene glycol of (2) from 40 to 90% by weight of an epoxy resin having the formula:

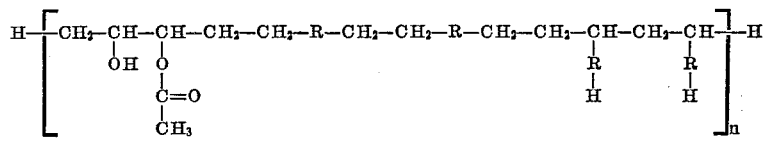

where —R— is a member selected from the group consisting of

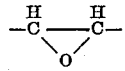

and

at least one of R being

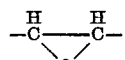

and at least one R being

and n is a number of such magnitude that the average molecular weight of the resin is from 1,200 to 1,500, (3) from 2–6% by weight of a dispersed wax selected from the group consisting of petroleum waxes and polyethylene wax and (4) from 1–5% by weight of boron trifluoride monoethylamine complex.

2. The ink of claim 1 wherein said epoxy resin has an epoxy equivalent of 177 and an average molecular weight of about 1,200.

3. The ink of claim 1 wherein said wax is polyethylene wax having a molecular weight of from 2,500 to 3,000.

4. The ink of claim 1 wherein said wax is microcrystalline wax.

5. The ink of claim 1 wherein said wax is paraffin wax.

6. The ink of claim 1 wherein said solvent is monomethyl ether of tripropylene glycol.

7. The ink of claim 1 wherein said solvent is the monoethyl ether of tripropylene glycol.

8. The ink of claim 1 wherein said solvent is the monoethyl ether of triethylene glycol.

9. The ink of claim 1 wherein said solvent is the monomethyl ether of dipropylene glycol.

10. The ink of claim 1 where said solution further includes a volatile aliphatic hydrocarbon cosolvent.

11. An ink consisting essentially of pigment dispersed in a vehicle consisting essentially of a solution in the monomethyl ether of tripropylene glycol of from 40–90% by weight of an epoxy resin having the formula:

$$H-\left[-CH_2-CH-CH-CH_2-CH_2-CH\underset{\diagdown O \diagup}{-}CH-CH_2-CH_2-CH=CH-CH_2-CH_2-CH-CH_2-CH-\right]-H$$

(with side groups OH, O-C(=O)-CH₃, CH, CH, O, CH₂, CH₂ as shown)

where $n$ is a number of such magnitude that the average molecular weight of the resin is about 1,200, the resin having an epoxy equivalent of 177 and an iodine number of 185 from 2–6% by weight of, a dispersed polyethylene wax having a molecular weight of 2,500 to 3,000 and from 1–5% by weight of boron trifluoride monoethylamine complex.

12. A process for printing on a substrate selected from the group consisting of glass and metal which comprises printing on said substrate with an ink consisting essentially of a pigment dispersed in a vehicle consisting essentially of a (1) solution in an etherified polyglycol solvent selected from the group consisting of methyl and ethyl monoethers of triethylene glycol, dipropylene glycol and tripropylene glycol of (2) from 40–90% by weight of an epoxy resin having the formula:

$$H-\left[-CH_2-CH-CH-CH_2-CH_2-R-CH_2-CH_2-R-CH_2-CH_2-CH-CH_2-CH-\right]-H$$

(with side groups OH, O-C(=O)-CH₃, R-H, R-H)

where R is a member selected from the group consisting of $$-\underset{H}{\overset{H}{C}}\underset{\diagdown O \diagup}{\phantom{X}}\underset{H}{\overset{H}{C}}-$$

and $$-\underset{H}{\overset{H}{C}}=\underset{H}{\overset{H}{C}}-$$

at least one of R being $$-\underset{H}{\overset{H}{C}}\underset{\diagdown O \diagup}{\phantom{X}}\underset{H}{\overset{H}{C}}-$$

and at least one R being $$-\underset{H}{\overset{H}{C}}=\underset{H}{\overset{H}{C}}-$$

and $n$ is a number of such magnitude that the average molecular weight of the resin is from 1,200 to 1,500, (3) from 2–6% by weight of a dispersed wax selected from the group consisting of petroleum waxes and polyethylene wax, and from 1–5% by weight of boron trifluoride monoethylamine complex and then heating said printed substrate to cure the ink.

13. A process for printing on a substrate selected from the group consisting of glass and metal which comprises printing on said substrate with an ink consisting essentially of pigment dispersed in a vehicle consisting essentially of a solution in the monomethyl ether of tripropylene glycol of from 40–90% by weight by an epoxy resin having the formula $$H-\left[-CH_2-CH-CH-CH_2-CH_2-CH\underset{\diagdown O \diagup}{-}CH-CH_2-CH_2-CH=CH-CH_2-CH_2-CH-CH_2-CH-\right]-H$$

(with side groups OH, O-C(=O)-CH₃, CH, CH, O, CH₂, CH₂ as shown)

where $n$ is a number of such magnitude that the average molecular weight of the resin is about 1,200, the resin having an epoxy equivalent of 177 and an iodine number of 185, from 2–6% by weight of a dispersed polyethylene wax having a molecular weight of 2,500 to 3,000 and from 1–5% by weight of boron trifluoride monoethylamine complex and then heating said printed substrate to cure the ink.

References Cited

UNITED STATES PATENTS

| | | | |
|---|---|---|---|
| 2,468,779 | 5/1949 | Rietz et al. | 260—33.2 |
| 2,518,607 | 8/1950 | Erickson | 260—33.2 |
| 2,717,885 | 9/1955 | Greenlee | 260—47 |
| 2,824,083 | 2/1958 | Parry et al. | 260—33.2 |
| 2,829,135 | 4/1958 | Greenspan et al. | 260—2 |
| 2,836,573 | 5/1958 | Rohrer | 260—33.2 |
| 3,017,374 | 1/1962 | Bernardi et al. | 260—28 |
| 3,028,344 | 4/1962 | Rowland et al. | 260—33.2 |
| 3,268,620 | 8/1966 | Tarwid | 260—33.2 |
| 3,285,802 | 11/1966 | Smith et al. | 260—824 |

MORRIS LIEBMAN, *Primary Examiner.*

B. AMERNICK, *Assistant Examiner.*

UNITED STATES PATENT OFFICE
CERTIFICATE OF CORRECTION

Patent No. 3,393,167  July 16, 1968

Frederick A. Varron et al.

It is certified that error appears in the above identified patent and that said Letters Patent are hereby corrected as shown below:

In the heading to the printed specification, line 5, "International Corporation" should read -- Interchemical Corporation --. Column 6, line 36, "by", second occurrence, should read -- of --.

Signed and sealed this 24th day of February 1970.

(SEAL)
Attest:

Edward M. Fletcher, Jr.

Attesting Officer

WILLIAM E. SCHUYLER, JR.

Commissioner of Patents